United States Patent [19]

Yoshida

[11] 4,259,699

[45] Mar. 31, 1981

[54] MAGNETIC RECORDING MEDIUM GUIDING APPARATUS

[75] Inventor: Shigeru Yoshida, Chichibu, Japan

[73] Assignee: Canon Kabushiki Kaisha, Tokyo, Japan

[21] Appl. No.: 18,911

[22] Filed: Mar. 9, 1979

Related U.S. Application Data

[63] Continuation of Ser. No. 872,780, Jan. 27, 1978, abandoned.

[30] Foreign Application Priority Data

Jan. 28, 1977 [JP] Japan .................................. 52-8319
Feb. 28, 1977 [JP] Japan ................................. 52-23675

[51] Int. Cl.³ ...................... G11B 15/00; G11B 17/00
[52] U.S. Cl. ......................................... 360/88; 360/2; 360/130.2
[58] Field of Search .......................... 360/88, 130.2, 2; 35/35 C; 271/274; 235/449, 450, 475, 483–484, 486; 101/234; 400/56

[56] References Cited

U.S. PATENT DOCUMENTS

| 356,406 | 1/1887 | Hey et al. | 101/234 |
| 388,366 | 8/1888 | Laass et al. | 101/234 |
| 3,348,320 | 10/1967 | Brokaw | 35/35 C |
| 3,787,661 | 1/1974 | Moorman et al. | 360/2 X |
| 3,872,501 | 3/1975 | McPherson | 360/88 X |
| 4,023,205 | 5/1977 | Warner | 360/2 X |
| 4,143,977 | 3/1979 | Kurihara et al. | 400/56 |

OTHER PUBLICATIONS

IBM/TDB, vol. 13, No. 8, Jan. 1971, p. 2350, "Pass Book for Desk Printer," by Delapchier et al.

*Primary Examiner*—John H. Wolff
*Attorney, Agent, or Firm*—Fitzpatrick, Cella, Harper & Scinto

[57] ABSTRACT

A magnetic medium feeding apparatus comprises a guide or a pressing member so biased as to keep the feeding load of magnetic medium substantially constant and also to apply a pressure to the magnetic medium through the guide or the pressing member so that a very smooth feeding of the magnetic medium may be assured in either case of automatic feed (by driving force of a motor or the like) and hand feed. The feeding apparatus for magnetic medium allows to smoothly feed various magnetic media different in thickness.

6 Claims, 8 Drawing Figures

MAGNETIC RECORDING MEDIUM GUIDING APPARATUS

This is a continuation of application Ser. No. 872,780 filed Jan. 27, 1978, now abandoned.

BACKGROUND OF THE INVENTION

1. Field of the Invention

The present invention relates to a magnetic medium guiding apparatus in which the guiding load of a magnetic medium is made substantially constant so as to assure a smooth guiding of the magnetic medium.

2. Description of the Prior Art

During the past few years there has been a remarkable development in a system in which magnetic cards are used. In particular, an increasing use of such system is found in banking as a cash-card system.

Among others, there has become known and practically used a sophisticated magnetic card reading machine which performs various functions and can be incorporated into a cash dispenser, teller's machine or the like.

However, such apparatus inevitably necessitates a high cost. While a good quality machine of a highly efficient power system may include such an expensive apparatus, the cost becomes too high to be tolerable for a popular type one to which low cost is essential. This is a problem to be solved in the art.

An approach to the solution of this problem hitherto developed is a so-called hand scan system of a magnetic card reading machine. According to the system, a magnetic medium is moved by hand and the data recorded in the magnetic medium is read out. Magnetic card reading machines of this hand scan system are simple in structure and reliable in operation, and therefore they are successfully accepted in the market. The use of this type of machine is now spreading rapidly.

On the other hand, in banking the data input business at a teller's window is usually carried out manually by a clerk such by pushing a keyboard. This numerical data input business is extremely trouble-some especially when the numerical data to be put in are many and various such as including code the number of the customer, his account number and so on, and is therefore apt to lead to error in data input.

This trouble will be eliminated when a stripe of magnetic medium is labelled to a portion of a bankbook. All the data necessary for ordinary bank business such as bank code number, branch number, customer code number, his account number and the like are magnetically recorded in the magnetic medium and read out in the above described hand scan reading machine so as to put the data then read out into the associated main computer from the end machine. If the above could be realized, it would greatly contribute to a simplification of the numerical data input business and an elimination of trouble and error in data input work.

In order to attain the object, however, there is a problem to be solved which resides in the difference between a magnetic card and a magnetic bankbook in material and in thickness. A standardized magnetic card used in banking is 0.7 mm in thickness and its base is made of synthetic resin whereas a bankbook to be used as a magnetic book is usually of the thickness ranging from 1.5 to 2 mm and its base is composed of a plural number of paper sheets. In this manner, between a magnetic card and a magnetic book there is a large difference in material and in size. This means that two separate data reading units are required to read out the data recorded in the magnetic medium, one for a magnetic card and the other for a magnetic book. The overall size of apparatus necessary for this purpose becomes large accordingly and the manufacturing cost thereof also becomes very high.

Therefore, it is desired to provide a data reading apparatus which allows reading of data stored not only in a magnetic card but also in a magnetic book, employing only one single unit of apparatus. FIGS. 1(A)–(B) illustrate one example of such data reading apparatus according to the prior art which has many drawbacks and disadvantages as will be described hereinafter.

Referring now to FIG. 1, there are shown a pair of guides 40 and 41 which define a guide width 41-1 slightly larger than the thickness of a bankbook 42 (FIG. 1(A)). In the area of a magnetic head 43, there is defined a nip width 44-1 between the magnetic head and a pressing roller 44 which is slightly smaller than the thickness of a magnetic card 45 (FIG. 1(B)).

The magnetic bankbook 42 is fed in the direction of arrow 46 by hand and the fore edge 42a of the book 42 is pinched between the magnetic head 43 and the pressing roller 44. At this time point, as can be seen in the drawing of FIG. 1(A), there occurs an abrupt change in load of hand feeding of the bankbook because of the nip width 44-1 being considerably narrow as compared with the thickness of the bankbook 42. This makes the hand feed speed unstable and often leads to errors in reading the data recorded in the magnetic bankbook.

On the contrary, when the magnetic card 45 is fed in the direction of the arrow 46 by hand as shown in FIG. 1(B), the guide width 41-1 is too large as compared with the thickness of the magnetic card to such an extent that the pair of guides 40 and 41 may lose partially their effect on the magnetic card. As a result of the weakened guide effect, the fore edge 45a of the card running into the magnetic head 43 dangles in the guide channel up and down. This also makes the feeding velocity unstable and often leads to errors in reading the data stored in the magnetic card.

SUMMARY OF THE INVENTION

Accordingly, it is the primary object of the invention to provide an improved magnetic medium guiding apparatus which has versatility enough to enable various magnetic media of different thickness to pass through a single common guide channel without any trouble in reading the data contained in the magnetic media.

It is another object of the invention to provide an improved magnetic medium guiding apparatus which has an improved operation ability even for a magnetic medium lacking a sufficient stiffness.

A further object of the invention is to provide the apparatus of the above described type which also assures an accurate read-out or write-in of data for the magnetic medium fed into the apparatus.

Still a further object of the invention is to provide a magnetic medium guiding apparatus which can prevent a feed of magnetic medium in the reverse direction.

These and other objects, features and advantages of the invention will become more apparent upon a reading of the following detailed specification and drawing.

DETAILED DESCRIPTION OF THE PREFERRED EMBODIMENTS

Figure 1A:
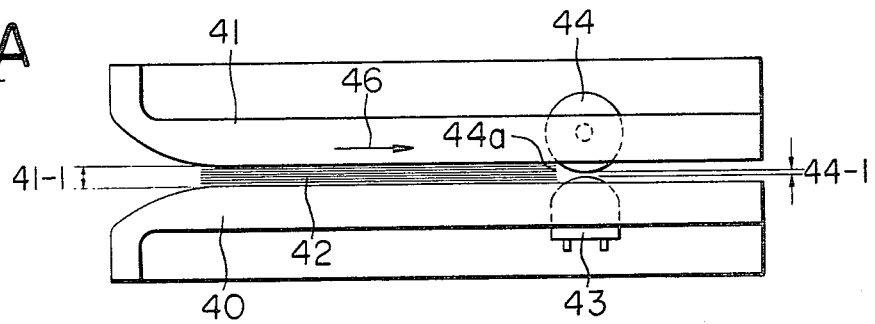
FIG. 1(A) is a plan of a magnetic medium feeding apparatus according to the prior art showing a magnetic bankbook being fed in the apparatus.
Figure 1B:
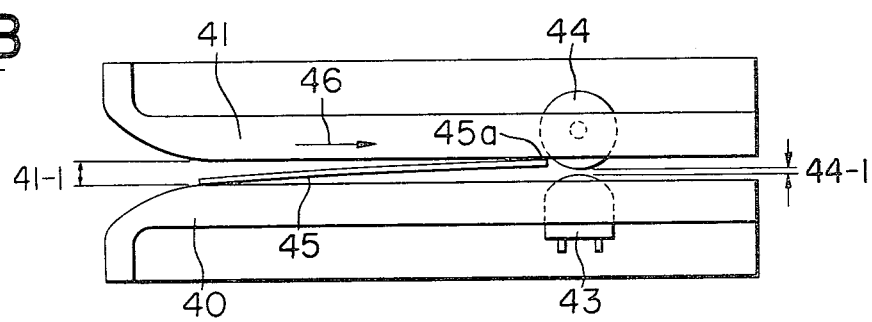
FIG. 1(B) is a similar view to FIG. 1(A), but showing a magnetic card being fed in the apparatus.
Figure 2A:
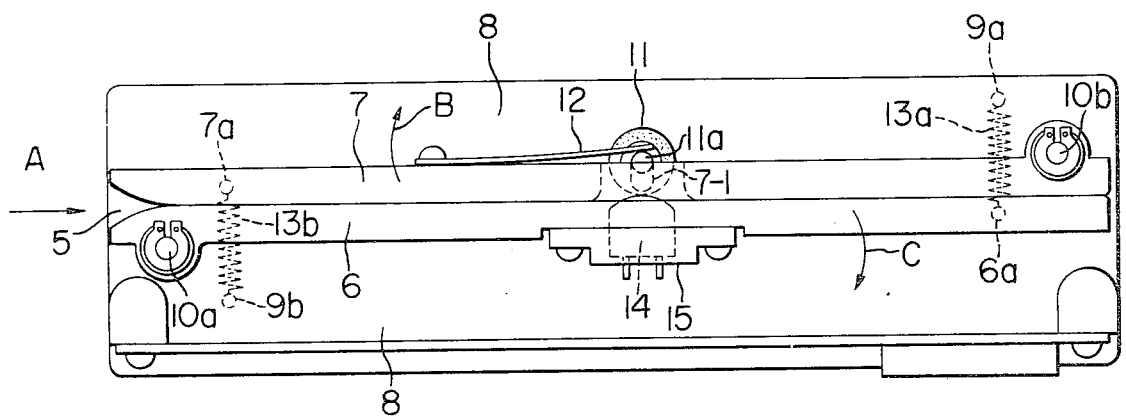
FIG. 2(A) is a plan of a magnetic medium feeding apparatus showing a first embodiment of the present invention.

Referring first to FIGS. 2(A) and (B) there is shown a first embodiment of the invention. The magnetic medium feeding apparatus includes a pair of guides 6 and 7 which are spring biased toward each other. In FIG. 2(A) the reference numeral 8 designates a base having two shafts 10a and 10b fixed thereto. One end of the guide 6 is pivotally mounted on the shaft 10a and that of another guide 7 on the other shaft 10b. The guide 7 has an elongate slot 7-1 in which the shaft 11a of a pressing roller 11 is rotatably engaged. The pressing roller 11 (pressing member is biased toward the guide 6 by means of a spring 12 one end of which is fastened to the guide 7. On the backside of the base 8 (on the opposite side to the guides 6 and 7), there are provided further two bias means, that is, springs 13a and 13b. One end of the spring 13a is fastened to a pin 9a provided on the backside of the base 8 while the other end is anchored on a pin 6a extending from the guide 6 over the backside of the base. In the same manner, one end of the spring 13b is fastened to a pin 9b provided on the backside of the base 8 and the other end is anchored on a pin 7a extending from the guide 7 over the backside of the base. Under the actions of these springs 13a and 13b thus arranged, the guides 6 and 7 are forced to press-contact with each other. The pressing roller 11 is disposed about the middle portion of the second guide i.e. the guide 7 and faces a magnetic head 14. The magnetic head 14 is disposed about the middle portion of the first guide i.e. the guide 6 and fixed thereto through its retainer 15.

Figure 2B:
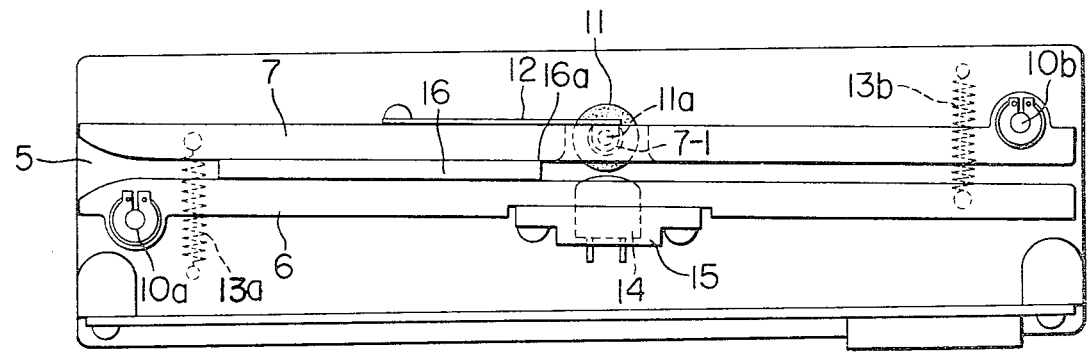
FIG. 2(B) is a similar view to FIG. 2(A), but with a magnetic medium being fed into the apparatus.

In FIG. 2(B), there is shown a magnetic medium 16 which may be a magnetic card or a magnetic bankbook. The magnetic medium 16 is inserted into the apparatus through its opening 5 in the direction of arrow A in FIG. 2(A) to urge the fore edge 16a of the magnetic medium to open the guide 7. The guide 7 is pivotally moved about its shaft 10b in the direction of arrow B and there is produced a space between the guides 6 and 7. Now, the magnetic medium 16 is caught in between guides 6 and 7 under pressure as seen in FIG. 2(B). As viewed in FIG. 2(B), the shaft 10b is positioned at the right side end of the guide 7 and the magnetic medium 16 is inserted from the left side of the guide 7. Therefore, at the time of insertion of the magnetic medium, only the left side end portion of the guide is initially opened for the magnetic medium 16. As the magnetic medium 16 is further advanced in the direction of arrow A, the space formed between the guides 6 and 7 is gradually spread in the same direction while the guide 6 also being pivotally moved about its shaft 10a in the direction of arrow C. This assures a smooth feeding (insertion and transportation) of the magnetic medium 16.

After a further advancement of the magnetic medium 16 in the direction of arrow A, it reaches the area of the magnetic head where the magnetic medium 16 is pinched in between the pressing roller 11 and the magnetic head 14. The magnetic medium 16 has a magnetic stripe (not shown) labelled to its surface on the side facing the guide 6. During the time of the magnetic medium being moved between the magnetic head and the pressing roller, the magnetic stripe slides on a gap part (not shown) formed on the magnetic head 14, so that on the magnetic stripe a writing in or reading out of the necessary data is carried out by the magnetic head 14. During this time period, the surface of the magnetic medium facing the magnetic head is pressed against the latter by the pressing roller 11 lying under the action of the spring 12.

A further movement of the magnetic medium 16 in the direction of arrow A makes it pass over the area between the pressing roller 11 and the magnetic head 14 and released from their pinching action. Finally the magnetic medium 16 is discharged from the guides 6 and 7.

Upon the magnetic medium 16 being discharged, the guide 6 swings about its shaft 10a in the opposite direction to the arrow C and therefore the guides 6 and 7 come into contact with each other so as to return to the starting position shown in FIG. 2(A). In this position, the end portion of the guides from which the magnetic medium 16 was discharged, is in such form as not to allow any insertion of the magnetic medium 16 from the direction opposite to the arrow A and therefore constitutes a reverse insertion preventing portion.

As will be understood from the foregoing, the magnetic medium feeding apparatus according to the first embodiment of the invention is able to apply a most suitable pressure to the magnetic medium 16 by a pair of guides 6 and 7 pressed against each other. Since the guide width formed between the guides 6 and 7 is determined automatically depending upon the thickness of a magnetic medium fed therein case by case, the apparatus is useful with either of the magnetic card of synthetic resin base 0.7 mm thick and the magnetic bankbook composed of a multiple number of paper sheets and having a thickness ranging from 1.5 to 2 mm.

This flexibility of guide width in compliance with the thickness of a magnetic medium fed in the apparatus serves to make constant the position of a stiff magnetic card as it runs into the magnetic head 14 and in case of a bankbook, it serves to compensate the poor stiffness of the bankbook. Thereby, an accurate writing in or reading out of the data is assured for both of the magnetic card and the bankbook.

Figure 3A:
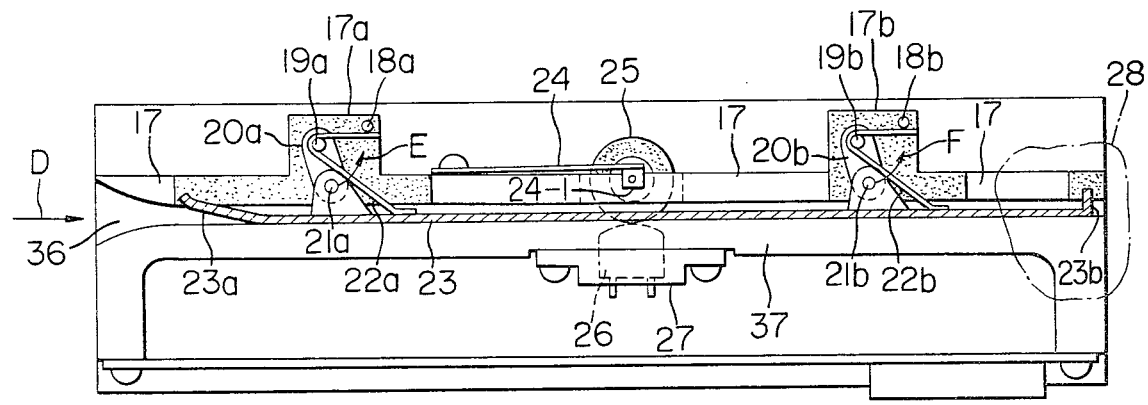
FIG. 3(A) shows a second embodiment of the invention.

In the second embodiment of the invention illustrated in FIG. 3(A), the magnetic medium feeding apparatus includes a pair of guides 17 and 37 and a pressing plate 23. The guide 17 is secured at two fixing portions 17a and 17b on which there are provided fixed pins 18a and 18b and shafts 19a and 19b respectively. On the shaft 19a there is loose fitted one end of a link 20a for swinging movement a, the other end of which has a shaft 21a fixed thereto. In the same manner, another link 20b is pivotally supported by the shaft 19b at its one end, the other end of which has a shaft 21b fixed thereto. These shafts 21a and 21b support the pressing plate 23 swing movably. To spring bias the pressing plate (second guide) toward the guide 37 (first guide), there are provided two biasing means, that is, springs 23a and 22b. The spring 22a extends from one end contacted with the pin 18a to the other end abutting against the backside surface of the pressing plate 23 turning round the shaft 19a. In the same manner, another spring 22b extends from one end contacted with the pin 18b to the other end abutting against the backside surface of the pressing plate turning round the shaft 19b.

At the middle portion on the backside surface of the guide 17 (third guide) there is fastened one end of a spring 24 the other end of which is in contact with a pinch roller 25 (pressing member) rotatably mounted facing a magnetic head 26. Under the action of the spring 24, the pinch roller 25 is urged toward the magnetic head 26.

A stopper 24-1 limits the position of the pinch roller 25 and the magnetic head 26 is secured at the middle portion of the guide 37 through its retainer 27.

Figure 3B:
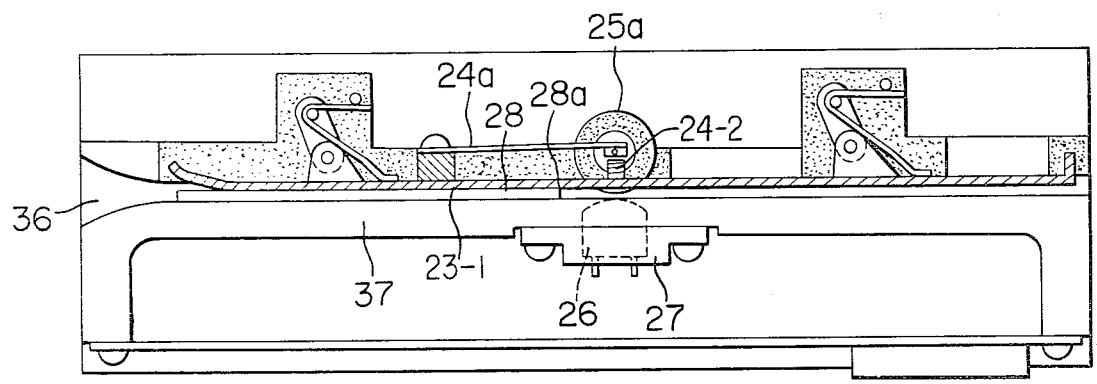
FIG. 3(B) shows a third embodiment of the invention.

The arrangement of the apparatus shown in FIG. 3(B) is essentially same as that of the apparatus shown in FIG. 3(A) with the exception of a supporting means for the pinch roller 25. Therefore, the manner of operation of the apparatus shown in FIG. 3(A) will be described hereinafter referring to FIG. 3(B). In FIG. 3(B) there is shown a magnetic medium 28 which may be a magnetic card or a magnetic bankbook. When the magnetic medium 28 is inserted into the apparatus through the open end portion 36 in the direction of arrow D (feeding direction), the fore edge 28a of the magnetic medium 28 applies a pressure to the inlet portion 23a of the pressing plate 23, which inlet portion is upwardly curved as shown in the drawing to accommodate it to an easy insertion of the magnetic medium. By the pressure applied by the magnetic medium, the pressing plate 23 swings about the shafts 19a and 19b in the direction of arrows E and F respectively. As a result, a space is produced between the pressing plate 23 and the guide 37, so that the magnetic medium gets in between the pressing plate and the guide. In this position, the magnetic medium is pressed against the guide 37 by the pressing plate 23. When the magnetic medium 28 is further advanced in the direction of arrow D, it reaches the area of the magnetic head where it is nipped between the pinch roller 25 and the magnetic head 26. The magnetic medium has a magnetic stripe (not shown) labelled to the surface on the side facing the guide 37. When the magnetic medium 28 is moved to pass through the nip between the pinch roller and the magnetic head, the magnetic stripe slides on a gap portion (not shown) formed on the magnetic head so that a writing in or reading out of the necessary data is carried out by the magnetic head 26 for the magnetic stripe. At this time point, the surface of the magnetic medium facing the magnetic head 26 is pressed against the latter by the pinch roller 25 spring biased by the spring 24.

When the magnetic medium is further more advanced in the direction of arrow D until it has passed over the area of the pressing plate 23 and the guide 37, the magnetic medium is freed from a confined state between them. Finally, the magnetic medium 28 is discharged from the outlet end portion 23b of the pressing plate 23.

At the time the magnetic medium 28 is discharged, the pressing plate 23 is pressed against the guide 37 by the biasing forces of the springs 22a and 22b so as to return to its starting position as shown in FIG. 3(A). In this position, the outlet end portion 23b of the pressing plate 23 constitutes a reverse insertion preventing part as can be seen in FIG. 3(A) and has an effect to prevent the magnetic medium 28 from being inserted from the right hand side as viewed in the drawing through the outlet.

In the third embodiment shown in FIG. 3(B) which is a slight modification of the second embodiment of FIG. 3(A), the spring 24a, the pinch roller 25a and the stopper 24-2 correspond the spring 24, the pinch roller 25 and the stopper 24-1 in FIG. 3(A) respectively.

In the embodiment of FIG. 3(A), the spring 24 for pressing the pinch roller 25 is fixed to the guide 17 at its one end. This arrangement has a drawback that when a relatively thick magnetic medium such as a bankbook is inserted, there often occurs some change of feeding load which in turn causes an irregularity of feeding speed.

In order to eliminate the above drawback according to the embodiment of FIG. 3(B), the spring 24 for pressing the pinch roller 25a (pressing member) as well as the stopper 24-2 are fixed to the pressing plate 23-1 (second guide). This arrangement allows the one end of the spring 24 to move together with the pressing plate 23-1 in compliance with the thickness of the magnetic medium 28. Therefore, it is possible to reduce the above mentioned change of feeding load caused by the difference in thickness of the magnetic medium 28 (that is a difference in size of the medium measured in a direction normal to the arrow D as viewed in the drawing).

Figure 3C:
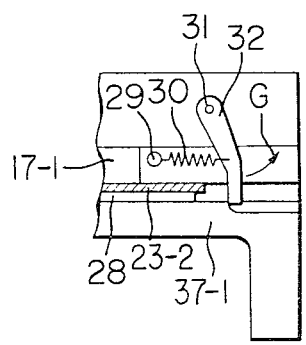
FIG. 3(C) is a partial plan view of the second or thir embodiment, but showing one modification of the adverse feed preventing part in detail.

FIGS. 3(C) and (D) show two modifications regarding the reverse insertion preventing part which are applicable to the embodiment shown in FIG. 3(A) or 3(B). The part shown in FIG. 3(C) or 3(D) corresponds to the magnetic medium discharging part 28' encircled by a one point chain line in FIG. 3(A).

Referring to FIG. 3(C), there is shown a lever 32 serving as a reverse insertion preventing member. The guide 17-1 has a pin 29 fixed thereto on which one end of a spring 30 is anchored. The other end of the spring 30 is fastened to the side surface of the lever 32 which is in turn mounted pivotally on a shaft 31 at one end of the lever. The shaft 31 is fixed on the body of the apparatus. The other end of the lever 32 abuts against the guide 37-1. Under the action of the spring 30, the lever 32 is biased forward the direction opposite to the arrow G. When the magnetic medium 28 passing through between the pressing plate 23-2 and the guide 17-1 comes into contact with the other end of the lever 32, the lever 32 is rotated about the shaft 31 in the direction of arrow G to permit an outlet of the magnetic medium 28. However, if one erroneously attempts to insert it in the reverse direction from the right hand side of the lever, then the lever prevents such a reverse insertion.

Figure 3D:
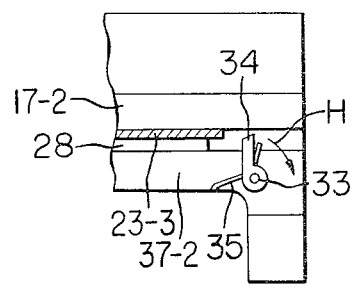
FIG. 3(D) is a similar view to FIG. 3(C), but showing another modification of the adverse feed presenting part in deta

In another modification of FIG. 3(D), the guide 37-2 has a shaft 33 fixed thereto. On the shaft 33 there is loose fitted one end of a lever 34 serving as a reverse insertion preventing member. The lever 34 is rotatable about the shaft 33 and normally placed under the action of a spring 35 coiled around the shaft 33. One end of the spring 33 is anchored at the side part of the lever 34 whereas the other end is anchored at a portion of the guide 37-2 so as to bias the lever 34 toward the direction opposite to the arrow H (the side surface of the lever abuts against the guide 37-2).

When the magnetic medium 28 passing through between the pressing plate 23-3 and the guide 37-3 comes into contact with the other end of the lever 34, the lever is rotated about the shaft 33 in the direction of arrow H to permit an outlet of the magnetic medium. But, if one erroneously attempts to insert it in the reverse direction from the right hand side of the lever 34, then the lever prevents the insertion.

The magnetic medium guiding apparatus according to the above described second and third embodiments also can be used for feeding either of a magnetic card or a bankbook as particularly mentioned above. Owing to the pressing plate 23, 23-1, 23-2 or 23-3, there is obtained a guide width corresponding to the thickness of the magnetic card or the bankbook then fed into the apparatus.

In this manner, in case of magnetic card, the position at which the magnetic card runs in the magnetic head 26 is kept constant whereas in case of a bankbook, its low stiffness is compensated. As a result, an accurate writing in or reading out of data is assured for either of a magnetic card or magnetic bankbook.

In the embodiments described above, the feed of magnetic medium may be done by hand or automatically employing a suitable driving means such as a motor.

While the invention has been particularly shown and described with reference to the preferred embodiments thereof, it will be understood by those skilled in the art that the foregoing and other changes in form and details can be made therein without departing from the sprit and scope of the invention.

I claim:

1. A device for guiding a manually urged recording medium, comprising:

first supporting guide means having an elongate planar surface second supporting guide means having an elongate planar surface and facing said first mentioned surface, a base, means associated with said base and said guide means for supporting one end of one of said guide means and the opposite end of the other of said guide means for pivotal movement relative to said base, bias means urging the free end of each of said first and second guide means toward the pivoted end of the other of said guide means, respectively, a magnetic head for reading or writing information out of or into a recording medium, said head being mounted on one of said guide means, means disposed opposite the magnetic head and mounted on the other of said guide means for urging a recording medium toward said magnetic head as the recording medium is guided between said elongate surfaces of said guide means, whereby, said opposed surfaces of said guide means automatically self-adjust to accommodate recording media of different thicknesses as the name is advanced for read out or write in of information by said magnetic head.

2. A device according to claim 1, wherein said means disposed opposite the magnetic head for urging the recording medium towards the magnetic head includes a roller.

3. A device according to claim 1 or 2, wherein said means for supporting said guide means for pivotal movement include a first shaft for rotatably supporting said one end of said one of said guide means and a second shaft for rotatably supporting said opposite end of said other of said guide means.

4. A device according to claim 3 wherein opposing portions of each of said guide means are shaped to facilitate reception of the magnetic recording medium therebetween and wherein second opposing portions of each of said guide means are shaped to impede movement of the magnetic recording medium therebetween.

5. A device according to claim 4, wherein said bias means includes a spring for exerting said first bias force, and has one end fixed to one of said guide means and the other end to a roller.

6. A guiding device for a manually urged magnetic recording medium comprising:

a magnetic head for writing information in a recording medium or reading information out of a recording medium, first supporting guide means for supporting said magnetic head and formed to define a first side of a guide passage for the recording medium, the passage being longer in the direction of movement of the medium than the length of the medium, bias means disposed opposite said magnetic head for biasing the recording medium toward said magnetic head with a first biasing force, second supporting guide means for supporting said bias means and formed to define a second side of the guiding passage for the recording medium:

means associated with one of said guide means for limiting movement of said bias means in one direction:

a base for movably supporting at least one of said guide means, and means for uniformly urging said at least one of said guide means towards the other of said guide means with a second bias force whereby, said opposed surfaces of said guide means automatically self-adjust to accommodate recording media of different thicknesses as the same is advanced for read out or write in of information by said magnetic head.

* * * * *

UNITED STATES PATENT AND TRADEMARK OFFICE
CERTIFICATE OF CORRECTION

PATENT NO. : 4,259,699
DATED : March 31, 1981
INVENTOR(S) : Shigeru Yoshida

It is certified that error appears in the above—identified patent and that said Letters Patent is hereby corrected as shown below:

On The Title, in the Abstract, line 1, "feeding" should read -- guiding --.

Column 1, line 41, after "such", insert -- as --.

Column 3, line 17, "thir" should read -- third --.

Column 3, line 22, "deta" should read -- detail --.

Column 8, line 5, "name" should read -- same --.

Signed and Sealed this

Twentieth Day of July 1982

[SEAL]

Attest:

GERALD J. MOSSINGHOFF

Attesting Officer     Commissioner of Patents and Trademarks

UNITED STATES PATENT AND TRADEMARK OFFICE
CERTIFICATE OF CORRECTION

PATENT NO. : 4,259,699
DATED : March 31, 1981
INVENTOR(S) : SHIGERU YOSHIDA

It is certified that error appears in the above—identified patent and that said Letters Patent is hereby corrected as shown below:

Column 3, line 36, "(pressing member" should be deleted.

Column 6, line 51, "forward" should read --toward--.

Signed and Sealed this

Fourteenth Day of September 1982

[SEAL]

Attest:

GERALD J. MOSSINGHOFF

Attesting Officer     Commissioner of Patents and Trademarks